(12) United States Patent
Nilsson et al.

(10) Patent No.: US 11,014,200 B2
(45) Date of Patent: May 25, 2021

(54) BRAZING SHEET

(71) Applicant: Granges AB, Stockholm (SE)

(72) Inventors: Stefan Nilsson, Finspång (SE); Roger Svensson, Grytgöl (SE); Richard Westergård, Finspång (SE); Torkel Stenqvist, Finspång (SE)

(73) Assignee: Gränges AB, Stockholm (SE)

( * ) Notice: Subject to any disclaimer, the term of this patent is extended or adjusted under 35 U.S.C. 154(b) by 147 days.

(21) Appl. No.: 16/092,646

(22) PCT Filed: Mar. 14, 2017

(86) PCT No.: PCT/EP2017/056037
§ 371 (c)(1),
(2) Date: Oct. 10, 2018

(87) PCT Pub. No.: WO2017/178182
PCT Pub. Date: Oct. 19, 2017

(65) Prior Publication Data
US 2019/0168343 A1 Jun. 6, 2019

(30) Foreign Application Priority Data

Apr. 12, 2016 (EP) .................................. 16164815
Apr. 12, 2016 (EP) .................................. 16164817

(51) Int. Cl.
*B23K 35/02* (2006.01)
*B23K 1/00* (2006.01)
(Continued)

(52) U.S. Cl.
CPC ........ *B23K 35/0238* (2013.01); *B23K 1/0012* (2013.01); *B23K 35/002* (2013.01);
(Continued)

(58) Field of Classification Search
CPC ........................... B23K 35/0238; B23K 1/012
(Continued)

(56) References Cited

U.S. PATENT DOCUMENTS 5,251,527 A   10/1993 Roberts
6,568,584 B2  5/2003 Wittebrood et al.
(Continued)

FOREIGN PATENT DOCUMENTS

CN    103354769 A    10/2013
CN    103917328 A    7/2014
(Continued)

OTHER PUBLICATIONS

International Search Report and Written Opinion dated Apr. 26, 2017, issued in corresponding International Application No. PCT/EP2017/056037.
(Continued)

*Primary Examiner* — Weiping Zhu
(74) *Attorney, Agent, or Firm* — Morgan, Lewis & Bockius LLP

(57) ABSTRACT

The invention concerns a brazing sheet comprising a core layer (5) and a braze cladding, said core layer (5) being aluminium or an aluminium alloy, said braze cladding comprising (a) a flux composite layer (2), which flux composite layer comprises a matrix of aluminium or an aluminium alloy, said matrix containing flux particles; (b) at least one filler alloy layer (1) not containing flux particles; and, (c) an aluminium or aluminium alloy layer (3) not containing flux particles, said layer forming the outermost surface of at least one side of the brazing sheet, wherein the flux composite layer (a) is positioned between said filler alloy layer (b) and said aluminium or aluminium alloy layer
(Continued)

Figure 1:
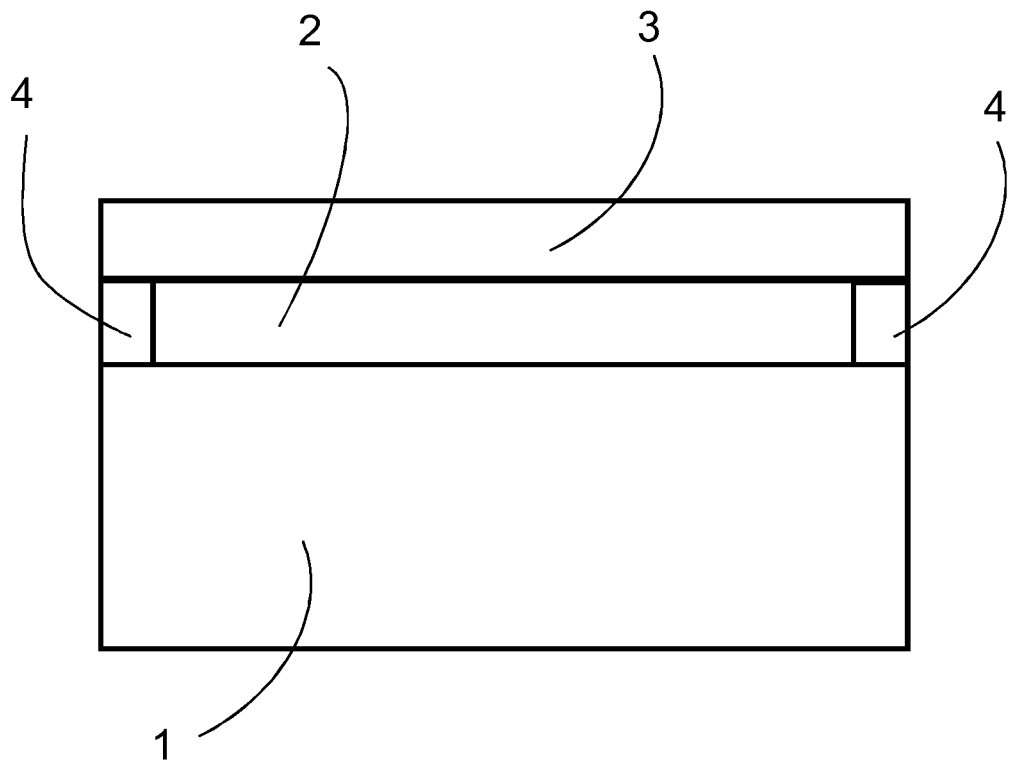

(c). The invention further concerns a method for its manufacturing, a cladding plate, use of the brazing sheet and a brazed heat exchanger.

25 Claims, 1 Drawing Sheet

(51) Int. Cl.

| | |
|---|---|
| B23K 35/28 | (2006.01) |
| B23K 35/36 | (2006.01) |
| B23K 35/00 | (2006.01) |
| B32B 15/01 | (2006.01) |
| C22C 21/02 | (2006.01) |
| C22C 21/00 | (2006.01) |
| F28F 21/08 | (2006.01) |
| B23K 35/362 | (2006.01) |

(52) U.S. Cl.
CPC ...... *B23K 35/0222* (2013.01); *B23K 35/0233* (2013.01); *B23K 35/28* (2013.01); *B23K 35/286* (2013.01); *B23K 35/362* (2013.01); *B23K 35/3603* (2013.01); *B23K 35/3605* (2013.01); *B32B 15/01* (2013.01); *B32B 15/016* (2013.01); *C22C 21/00* (2013.01); *C22C 21/02* (2013.01); *F28F 21/089* (2013.01); *F28F 2275/04* (2013.01)

(58) Field of Classification Search
USPC ........................................................ 148/24
See application file for complete search history.

(56) References Cited

U.S. PATENT DOCUMENTS

| 6,635,360 | B2 | 10/2003 | Takeno et al. |
| 7,337,941 | B2 | 3/2008 | Scott et al. |
| 9,486,881 | B2 | 11/2016 | Wittebrood et al. |
| 2011/0244262 | A1 | 10/2011 | Sato et al. |
| 2012/0177947 | A1 | 7/2012 | Abrahamsson et al. |
| 2013/0299564 | A1 | 11/2013 | Steiner et al. |

FOREIGN PATENT DOCUMENTS

| EP | 0552567 | A1 | | 7/1993 | |
| EP | 1004390 | A1 | | 5/2000 | |
| EP | 2272616 | A1 | | 1/2011 | |
| EP | 2907615 | A1 | | 8/2015 | |
| FR | 2855085 | A1 | | 11/2004 | |
| JP | 61003662 | A | * | 1/1986 | ............... B23K 1/19 |
| JP | S613662 | A | | 1/1986 | |
| JP | H03142079 | A | | 6/1991 | |
| JP | 06315791 | A | * | 11/1994 | ........... B23K 35/286 |
| JP | H06-315791 | A | | 11/1994 | |
| JP | 2000-117319 | A | | 4/2000 | |
| JP | 2003-170279 | A | | 6/2003 | |
| JP | 2009-090330 | A | | 4/2009 | |
| RU | 2334604 | C2 | | 9/2008 | |
| RU | 2537052 | C2 | | 12/2014 | |
| WO | 2008/110808 | A1 | | 9/2008 | |
| WO | 2008/155067 | A1 | | 12/2008 | |
| WO | 2011/034496 | A2 | | 3/2011 | |
| WO | 2013/038934 | A1 | | 3/2013 | |
| WO | 2013/180630 | A1 | | 12/2013 | |

OTHER PUBLICATIONS

International Preliminary Report on Patentability dated Jun. 4, 2018, issued in corresponding International Application No. PCT/EP2017/056037.

* cited by examiner

BRAZING SHEET

The present invention relates to an aluminium alloy brazing sheet comprising a braze cladding that contains flux and a method for its manufacturing. The invention further relates a cladding plate useful as an intermediate product in the manufacturing of the brazing sheet. Finally, the invention relates to the use of the brazing sheet for the manufacturing of a brazed heat exchanger and a brazed product, particularly a brazed heat exchanger, made from the brazing sheet.

Aluminium alloy brazing sheets can be used for the manufacturing of brazed heat exchangers such as radiators, condensers, evaporators etc. that commonly are used in automotive engine cooling or air conditioning systems, as well as in industrial heat exchange systems. A common type of heat exchanger includes a number of parallel tubes (welded/folded/multi chamber etc) with each tube joined typically at either end to headers and corrugated fins separating any two adjacent tubes. Other kinds include plate heat exchangers and plate and bar heat exchangers.

Aluminium alloy brazing sheets usually comprise a core and a braze cladding made of an aluminium alloy having a lower melting temperature than the core. The brazing operation is normally done in vacuum or in an inert atmosphere (usually dry nitrogen), the latter also referred to as controlled atmosphere brazing (CAB brazing). Since equipment for vacuum brazing is very complicated and also the brazing process is complicated and need to be controlled within very tight limits, CAB brazing is now the dominating technology in commercial applications. However, practical operation of CAB brazing requires addition of flux, most commonly Al—K—F based flux such as Nocoloc®, to remove oxides on the surface of the aluminium alloy sheets to be brazed. The use of flux requires extensive extra process steps, both for its application and in some cases for removal of residual flux, as well as cleaning of the equipment.

Attempts have been made to design brazing sheets that can be CAB brazed without the use of flux, as described in e.g. U.S. Pat. Nos. 6,568,584 B2, 6,635,360 B2, WO 2008/155067 A1, WO2011/034496 A2 and WO2013/180630 A1. However, this technology requires careful control of the brazing process and is only used to a very limited extent.

Another approach is to incorporate flux into an aluminium filler alloy, as disclosed in e.g. WO2008/110808 A1, EP552567 A1 and FR2855085 A1. Brazing sheets comprising such a filler alloy show very good brazing performance, but cladding plates of a filler alloy with incorporated flux are complicated to produce and have also been found to cause problems in the rolling operation for producing the brazing sheets. Furthermore, scrap obtained in the production of the brazing sheets contains flux and is complicated to recycle.

A further approach is to mechanically embed flux into a sheet as disclosed in EP1004390 A1 and JP2009-090330.

EP2907615 A1 discloses an aluminium based brazing sheet comprising a core layer, a brazing alloy layer and a composite layer of a brazing alloy powder and flux powder forming the outermost layer.

JPH06-315791 discloses a flux contained Al brazing sheet clad with a liner material, which is composed of a flux contained Al alloy brazing filler metal containing a brazing filler metal composition and a flux composition, at least on one surface of a core material consisting of aluminium or its alloy. On at least one outer surface of the liner material, a coating layer is formed consisting of aluminium or its alloy.

It is an object of the invention to provide a self-fluxing brazing sheet that is comparatively simple to produce and shows good brazing performance also with a relatively low content of flux.

It is a further object of the invention to provide a cladding plate useful as an intermediate product for the preparation of the brazing sheet.

One aspect of the invention concerns a brazing sheet as defined in claim 1. More specifically, such a brazing sheet comprises a core layer and a braze cladding, said core layer being aluminium or an aluminium alloy, said braze cladding comprising (a) a flux composite layer, which flux composite layer comprises a matrix of aluminium or an aluminium alloy, said matrix containing flux particles; (b) a filler alloy layer not containing flux particles; and, (c) an aluminium or aluminium alloy layer not containing flux particles, said layer forming the outermost surface of at least one side of the brazing sheet, wherein the flux composite layer (a) is positioned between said filler alloy layer (b) and said aluminium or aluminium alloy layer (c). The aluminium or aluminium alloy layer (c) may be of aluminium, of a filler alloy of the same or different kind as in the filler alloy layer (b), or of a non-filler aluminium alloy. Similarly, the matrix of the composite layer may be of aluminium, of a filler alloy of the same or different kind as in the filler alloy layer (b), or of a non-filler aluminium alloy.

For any description of alloy compositions or preferred alloy compositions, all references to percentages are by weight percent (wt %) unless otherwise indicated.

The term "sheet" as used herein also include flat rolled material with thicknesses ranging from thin foil to thick plate.

The term "flux composite layer" as used herein is not pure flux but a layer of a matrix of aluminium or an aluminium alloy that contains particles of flux.

The term "flux" as used herein refers to brazing flux, i.e. a substance that either directly or in the form of a reaction product thereof during brazing contributes in disrupting or dissolving an oxide film on a surface to be brazed.

The term "filler alloy" as used herein refers to an aluminium alloy having a liquidus temperature that is lower than the solidus temperature of the core layer and the purpose of said filler alloy is to melt and form a joint with a counter surface.

The brazing sheet of the invention may comprise a braze cladding as described herein on only one side or on both sides of the core, depending on the intended use.

At any side on which the brazing sheet comprises a braze cladding as described herein, an aluminium or aluminium alloy layer not containing flux particles forms the outermost surface of at least one side of the brazing sheet. Such a layer may be a filler alloy layer or a non-filler aluminium or aluminium alloy layer. This has surprisingly been found to improve the brazing and has further been found to facilitate the rolling operation used in the production process, for example by reducing the risk for flaking etc. of the outer layer.

The braze cladding comprises at least one filler alloy layer and preferably at least two filler alloy layers. At least one filler alloy layer is positioned at the side of the flux composite layer facing the core layer of the brazing sheet and may be attached directly to the core layer or to an interlayer there between. Preferably the flux composite layer is positioned between two filler alloy layers, in which case a filler alloy layer forms the outermost surface of at least one side of the brazing sheet and the aluminium or aluminium alloy layer not containing flux particles forming an outermost surface of the brazing sheet preferably constitute one of the filler alloy layers. The above arrangement enables the flux to have a relatively short distance to the surface without decreasing the total amount of filler alloy. Alternatively, the flux composite layer may be positioned between a filler alloy layer and a non-filler aluminium or aluminium alloy layer not containing flux particles, in which case said layer of another aluminium alloy preferably forms the outermost surface of at least one side of the brazing sheet. In case of two filler alloy layers, they are preferably on each side of the flux composite layer.

The braze cladding preferably constitutes from 1 to 25%, most preferably from 2 to 20%, particularly from 5 to 18% of the thickness of the brazing sheet. The flux composite layer preferably constitutes from 2 to 80%, most preferably from 5 to 50% of the thickness of the braze cladding. The layer forming the outermost surface of the brazing sheet preferably constitutes from 2 to 20%, most preferably from 4 to 15% of the thickness of the braze cladding, while the flux composite layer and the inner filler alloy layer or layers preferably constitute the remaining part. The total gauge of the entire brazing sheet depends on its intended use and may, for example, be from 50 µm to 3 mm or from 100 µm to 2 mm. The exact values for the thickness of the individual layers depends on the total gauge, the flux content in the flux composite layer as well as on the intended use of the brazing sheet.

A filler alloy layer is a layer of a filler alloy not containing flux particles. The filler alloy is an aluminium alloy preferably comprising Si, most preferably in an amount from 2 to 15 wt %, particularly from 4 to 15 wt %, such as from 5 to 14 wt % or from 6 to 13 wt %. Small amount of other elements may optionally be present, such as Bi for improving the wetting, and Zn and Cu for adjusting the corrosion potential, as well as small amounts of various elements present in scrap used as raw materials and that are acceptable in certain amounts. Useful filler alloys include AA4XXX alloys such as AA4343, AA4045 and AA4047. A typical filler alloy may, for example, consist of 4-15 w % Si, ≤0.5 wt % Bi, ≤0.25 wt % Cu, ≤0.1 wt % Mn, ≤0.2 wt % Ti, ≤0.8 wt % Fe, ≤0.05 wt % each and ≤0.2 wt % in total of unavoidable impurities, and balance Al. The exact composition should be set so the filler alloy melts within the desired temperature range, preferably from 550 to 615° C. In case of at least two filler alloy layers, they may have identical or different compositions and may consequently also have different melting temperatures or melting temperature ranges.

A non-filler aluminium or aluminium alloy layer is a layer of aluminium or a non-filler aluminium alloy, an alloy having liquidus temperature higher than the solidus temperature of the filler alloy or alloys in the brazing sheet. Such a non-filler aluminium alloy preferably contains <2 wt % Si. Most preferably a non-filler aluminium alloy contains ≤1.65 wt % or ≤1.0 wt % Si, which means that any Si present is in solid solution rather than as particles. The material for such a layer can be essentially pure aluminium with only unavoidable impurities of other elements, typically below 0.05 wt % each and below 0.15 wt % in total, or an aluminium alloy that, for example, may be any AA1XXX, AA2XXX, AA3XXX, AA4XXX, AA7XXX or AA8XXX aluminium alloy. To ensure optimal brazing it is preferred that the amount of Mg is limited, preferably ≤0.4 wt %, more preferably ≤0.3 wt %, most preferably ≤0.2 wt %, particularly ≤0.1 wt % or ≤0.05 wt %. Possible aluminium alloys include those containing at least 99 wt % Al such as AA1050 (in wt %≤0.25 Si, ≤0.4 Fe, 0.05 Cu, ≤0.05 Mn, ≤0.05 Mg, ≤0.05 Zn, ≤0.05 Ti, ≤0.05 each and ≤0.15 in total of other elements, balance Al). Further possible alloys include e.g. AA3003 (in wt %≤0.6 Si, ≤0.7 Fe, 0.05-0.2 Cu, 1-1.5 Mn, ≤0.1 Zn, ≤0.05 each and ≤0.15 in total of other elements, balance Al). Using a layer of essentially pure aluminium or a non-filler aluminium alloy layer enables tailoring the end composition of the brazed joint, e.g. to obtain a desired corrosion potential profile. Using such a layer as an outermost layer also reduces wearing of the forming tools used for the production of the brazing sheet.

The matrix of the flux composite layer can be essentially pure aluminium with only unavoidable impurities of other elements, typically below 0.05 wt % each and below 0.15 wt % in total, or an aluminium alloy that, for example, may be any AA1XXX, AA2XXX, AA3XXX, AA4XXX, AA7XXXX or AA8XXX aluminium alloy. To ensure optimal brazing it is preferred that the amount of Mg in the matrix of the flux composite layer is limited, preferably ≤0.3 wt %, most preferably ≤0.2 wt %, particularly ≤0.1 wt % or ≤0.05 wt %. It is also preferred if the content of Mn in the matrix is ≤2 wt %, most preferably ≤1.5 wt %. A possible aluminium alloy is a filler alloy as described above, that may or may not be identical to the alloy in one or more of the filler alloy layers (e.g. a AA4XXX alloy such as AA4343, AA4045 or AA4047). Other possible aluminium alloys include non-filler aluminium alloys as described above. Using essentially pure aluminium or a non-filler aluminium alloy for the flux composite layer enables tailoring the end composition of the brazed joint, e.g. to obtain a desired corrosion potential profile. It also provides an opportunity to tailor and facilitate the bonding of the flux composite layer to the adjacent layers.

The flux can be any substance that either directly or in the form of a reaction product thereof during brazing contributes in disrupting an oxide film on a surface to be brazed. The content of flux in the flux composite layer is preferably from 1 to 20 wt %, most preferably from 1 to 15 wt %, particularly from 1 to 10 wt %. The amount of flux in the braze cladding is preferably from 0.02 to 5 g/m$^2$, most preferably from 0.1 to 2 g/m$^2$ of the outer surface. The melting point of the flux is preferably lower than the melting point of the aluminium or aluminium alloy matrix of the flux composite layer. The flux is preferably present as particles in the matrix of aluminium or aluminium alloy, for example having an equivalent diameter from 1 nm up to 10 µm or up to 5 µm. Preferably the flux is insoluble in the matrix of aluminium or aluminium alloy. A suitable flux is at least one inorganic salt, preferably containing F and at least one of Li, Na, K, Rb, Cs, Fr, Al, Zn or Sn, particularly at least one of K, Li, Cs, Na or Al. Examples of such salts include one or more of potassium fluoro aluminate like potassium tetra-, penta-, and hexa-fluoroaluminates ($KAlF_4$, $K_2AlF_5 \cdot H_2O$, $K_3AlF_6$ etc.), and the aforementioned salts that may also contain hydroxyfluoro- or oxyfluoroalumium species ($AlF_2OH \cdot H_2O$, $Al_2F_4O$, $AlF(OH)_2$, $AlFO$ etc.). Other possible salts include one or more of sodium fluoroaluminates ($Na_3AlF_6$), cesium aluminium fluorides ($CsAlF_4$, $Cs_2AlF_5$ etc.), potassium silicofluorides ($K_2SiF_6$, $K_3SiF_7$ etc.), alkali zinc fluorides ($KZnF_3$ etc.) and potassium tin fluoride salts ($KSnF_3$, $KSnF_5$, $K_2SnF_6$, $K_3SnF_7$ etc.). Further possible salts include $AlF_3$, NaF, KF, LiF, $K_{1-3}AlF_{4-6}$, $Cs_{1-3}AlF_{4-6}$, $Li_3AlF_6$, and $Cs_xAl_yF_2$. Any of the above salts can be used alone or in mixtures. Also hydrates of all the above mentioned salts can be used.

The core layer of the brazing sheet can be any suitable aluminium alloy, particularly an AA3XXX or an AA6XXX aluminium alloy, but also AA2XXX, AA7XXX and AA8XXX alloys may come into question. Examples of useful alloys include those consisting of, in wt %, ≤2 Si, ≤2 Fe, ≤3 Cu, ≤2 Mn, ≤1 Mg, ≤0.5 each of one or more of Ti, Zr, Cr, V and Sn, balance aluminium and ≤0.05 each and ≤0.15 in total of unavoidable impurities.

A brazing sheet of the invention comprises a core layer and at least one braze cladding as described herein, either only one such braze cladding or one such braze cladding on each side of the brazing sheet. The at least one braze cladding may be attached directly to the core layer or to an interlayer positioned between the core layer and the at least one braze cladding. A brazing sheet of the invention may also have a braze cladding as described herein at one side of the core layer and one or more claddings on the other side, such as sacrificial cladding of a less noble aluminium alloy. Such a sacrificial cladding protects the core from corrosion and may, for example, be intended to face the inside of a tube formed from the brazing sheet. Suitable temper in the delivery condition depends on the intended use and may, for example, be any of O temper, F, H1X such as H12, H14, H16 or H18, or H2X such H24 or H26, or a T4 or T6 temper in the case of an age hardening alloy.

At brazing, the brazing sheet is heated to a temperature sufficient for melting the filler alloy, preferably from 550 to 615° C. In case the matrix of the flux composite layer is a filler alloy having a melting point below the braze temperature, it will also melt and release the flux to serve its purpose of disrupting or dissolving any oxide film present on the brazing sheet. In case the matrix of the flux composite layer is aluminium or an aluminium alloy having a higher melting temperature, Si migrating from the at least one filler alloy layer will lower the melting temperature sufficiently for the matrix to melt and the flux to release and also in this case serve its purpose.

Compared to prior art brazing sheets containing flux, as described in e.g. WO2013/180630 A1, it has been found that the brazing sheet of the invention perform adequate brazing but with lower total amount of flux than expected. Using the brazing sheet of the invention thus lowers the consumption of flux and also reduces the amount of residual flux remaining after brazing, e.g. at the inside of tubes that is difficult to clean. Further, the amount of aluminium or aluminium alloy containing flux particles required for producing the brazing sheet is also lower, which is highly advantageous since such material is complicated to produce. Finally, the lower amount of aluminium or aluminium alloy containing flux particles reduces the amount of flux contaminated scrap obtained in the production process, which scrap is complicated to recycle.

The invention also concerns a method for the manufacturing of a brazing sheet as described herein. The method comprises the steps of joining a core layer of an aluminium alloy, a filler alloy layer not containing flux particles, a flux composite layer of a matrix of aluminium or an aluminium alloy, said matrix containing flux particles, and an aluminium or aluminium alloy layer not containing flux particles forming the outermost surface of at least one side of the brazing sheet and the flux composite layer being positioned between said filler alloy layer and said aluminium or aluminium alloy layer, followed by rolling to obtain a brazing sheet of the desired gauge. Regarding the preferred compositions and arrangements of the layers, the above description of the brazing sheet is referred to.

The material for the flux composite layer can be produced by any suitable method for obtaining a matrix of aluminium or an aluminium alloy containing flux particles. Possible, methods include obtaining a body of the material by spray forming as described in WO2008/110808 A1, or by subjecting powder of aluminium or an aluminium alloy and flux particles to high pressure as described in EP552567 A1 or FR2855085 A1, particularly Hot Isostatic Pressing (HIP). Other possible methods are thermal spraying such as flame spraying or plasma spraying, or additive manufacturing technology such as 3D metal printing. Depending on the size and the geometric form of the resulting body, it may be extruded or worked in any other suitable way to obtain a slab or plate that, if desired, can be hot and/or cold rolled to the desired thickness.

The materials for the filler alloy layers can be cast in any conventional way, e.g. by DC casting, and rolled to obtain plates of desired thickness. Also the material for the core layer can be cast in any conventional way, e.g. by direct chill (DC) casting, to obtain a slab of desired size.

In the method of the invention, a plate of a flux composite (i.e. aluminium or an aluminium alloy containing flux particles), a plate of a filler alloy not containing flux particles, a plate of an aluminium or aluminium alloy layer not containing flux particles (that may or may not be a filler alloy), and a slab of an aluminium alloy for the core can be joined, followed by rolling to obtain a brazing sheet of the desired gauge.

A particularly preferred method of the invention comprises joining a filler alloy layer not containing flux particles, a flux composite layer, and an aluminium or aluminium alloy layer not containing flux particles (that may or may not be a filler alloy layer), to obtain a cladding plate comprising the flux composite layer between said filler alloy layer and said aluminium or aluminium alloy layer, and joining the cladding plate to a slab of an aluminium alloy for the core, followed by rolling to obtain a brazing sheet of the desired gauge.

The rolling in the manufacturing of the brazing sheet preferably comprises hot rolling at a preferred temperature from 350 to 550° C. and with a preferred thickness reduction from 90 to 99.5%, followed by cold rolling with a preferred thickness reduction from 25 to 99% or from 50 to 99%.

Prior to rolling, the flux composite layer may include side sections arranged along the edges in the rolling direction at opposite sides of the flux composite that then forms a centre section of the layer. The side sections are of a different material than the actual flux composite and does preferably not contain flux particles. Each side section preferably constitutes from 1 to 20% or from 2 to 20%, most preferably from 3 to 20% or from 3 to 10% of the entire width (cross the rolling direction) of the flux composite layer. In one or several stages during and/or after the rolling process the edges of the brazing sheet parallel to the rolling direction are cut off to the extent that the side sections will be included in the unavoidable edge scrap and will thus not be part of the final product. The side sections can be made of aluminium or any aluminium alloy having appropriate mechanical properties so the rolling can be performed without significant problems. Examples of possible aluminium alloys include AA4045 (in wt % 9.0-11.0 Si, ≤0.8 Fe, ≤0.30 Cu, ≤0.05 Mn, ≤0.05 Mg, ≤0.10 Zn, ≤0.2 Ti, ≤0.05 each and ≤0.15 in total of other elements, balance Al), AA3003, AA1050, as well as any alloy identical to or similar to the alloy used for the core of the brazing sheet or used for any of the layers in the braze cladding.

Use of side sections avoids significant amounts of flux being included in the falling edge scrap, thus facilitating recycling of said scrap. For the same purpose it is also possible to use sections of the same or similar material as side sections for the head and the tail of the flux composite layer, sections that also will be removed during and/or after the rolling process. Each head and tail section may, prior to rolling, preferably constitute from 3 to 20%, most preferably from 4 to 10% of the total length (in the rolling direction) of the flux composite layer.

The method of manufacturing the brazing sheet may also include other conventional steps commonly used in the production of aluminium based brazing sheets, such as heat treatments, stretch levelling, slitting etc.

A further aspect of the invention concerns a cladding plate comprising a flux composite layer as described herein, at least one filler alloy layer not containing flux particles as described herein, and an aluminium or aluminium alloy layer not containing flux particles as described herein, wherein the flux composite layer is positioned between said filler alloy layer and said aluminium or aluminium alloy layer. The cladding plate may comprise or consist of a flux composite layer and two or more layers not containing flux particles, such as two filler alloy layers (in which case the aluminium or aluminium alloy layer preferably is a filler alloy layer), or one filler alloy layer and one non-filler alloy layer. For example, the cladding plate may comprise or consist of one filler alloy layer on each side of the flux composite layer or a filler alloy layer and a non-filler alloy layer on each side of the flux composite layer. The cladding plate may further comprise a layer of an aluminium alloy intended to form an interlayer in the final brazing sheet, for example for serving the purpose of inhibiting migration of Si into the core during brazing. As earlier described, such a cladding plate is useful as an intermediate product in the method of manufacturing the brazing sheet of the invention.

The cladding plate may comprise side sections and/or head and tail sections of a material different from the flux composite as described above.

The cladding plate preferably has a thickness from 5 to 250 mm, most preferably from 10 to 150 mm. The flux composite layer preferably constitutes from 2 to 80%, most preferably from 5 to 50% or from 10 to 50% of the total thickness of the cladding plate. The filler alloy layer or layers preferably constitute the remaining part. The layer intended to form the outermost surface of the final brazing sheet preferably constitutes from 2 to 20%, most preferably from 4 to 15%, such as from 5 to 15% or from 10 to 15% of the thickness of the cladding plate.

Regarding suitable and preferred materials and compositions of the layers, the above description of the brazing sheet is referred to.

The invention further concerns the use of a brazing sheet of the invention for the manufacturing of a brazed product, such as a heat exchanger.

The invention finally concerns a brazed product, particularly a brazed heat exchanger, made by forming a brazing sheet of the invention into parts of desired shape, assembling said parts optional further parts required, followed by brazing to join the parts and obtaining the heat exchanger. Preferably, the brazing is performed without any flux in addition to the flux already included in the brazing sheet.

Figure 2:
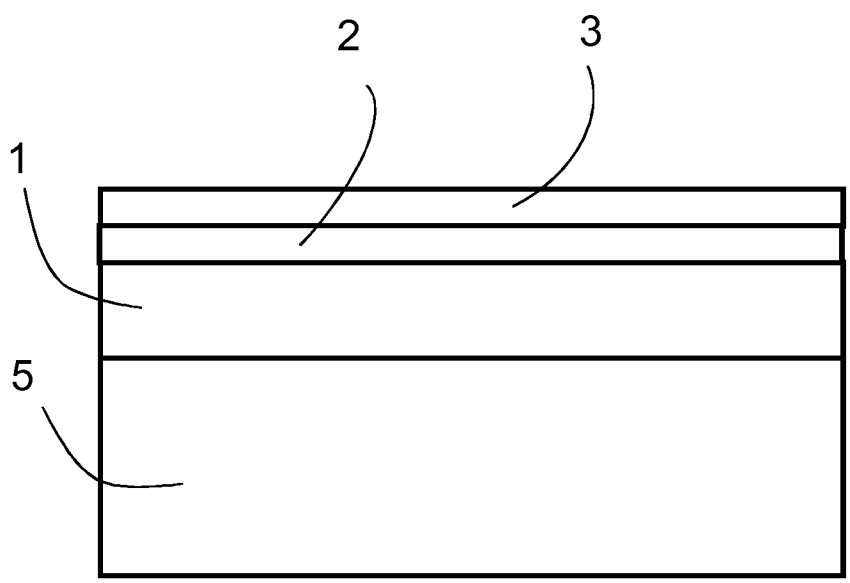

FIG. 1 schematically shows an embodiments of a cladding plate according to the invention, while FIG. 2 schematically shows an embodiment of a brazing sheet according to the invention.

Referring to FIG. 1, it is shown a cross section in the rolling direction of a cladding plate. The cladding plate comprises two filler alloy layers 1, 3 arranged on each side of a flux composite layer 2. Alternatively, one of the layers 1, 3, preferably the thinnest layer 3, may be a non-filler aluminium or aluminium alloy layer. Along the edges of the flux composite layer side sections 4 are arranged along the intended rolling direction. The filler alloy layer 1 is intended to face the core of a brazing sheet, while the thinnest filler alloy layer (or non-filler aluminium or aluminium alloy layer) 3 is intended to constitute the outermost surface of at least one side of a brazing sheet.

Referring to FIG. 2, the brazing sheet comprises a core 5 with a braze cladding having two filler alloy layers 1, 3 arranged on each side of a flux composite layer 2. Alternatively, the outermost layer 3 may be a non-filler aluminium or aluminium alloy layer. The brazing sheet may be produced by attaching a cladding plate as shown in FIG. 1 followed by rolling and cutting off the side supports.

EXAMPLES

The invention is further described in connection with the following Examples, which, however, is not intended to limit the scope of the invention.

Materials

In all examples a core material of Mg-free AA3003 was sampled from a non-homogenised slab having the composition: 0.14 wt % Si, 0.50 wt % Fe, 1.09 wt % Mn, 0.12 wt % Cu, balance Al and inevitable impurities. The core material was preheated with 80° C./h to 400° C., 20° C./h to 480° C. and soaked for 2 h before free cooling in air.

The filler alloys used for the filler alloy layers were either AA4045 (Al with 10 wt % Si sampled from a hot breakdown rolled plate) or AA4343 (Al with 7.8 wt % Si sampled from a hot breakdown rolled plate).

In Examples 1 and 2 the material for the flux composite layer was sampled from a body prepared by spray forming according to WO2008/110808 followed by extrusion and laboratory cold rolling. The aluminium alloy for the matrix of the flux composite layer was AA4045 and the flux was $AlKF_4$.

In Examples 3 and 4 the materials for the flux composite layer were sampled from bodies prepared by Hot Isostatic Pressing (HIP) of mixtures of metal powder and Nocolok® 100, a flux powder based on potassium fluoroaluminate. Both the chemical composition of the metal as well as the amount of flux was varied. The metal powders were produced through gas atomising using argon, giving a mean powder particle diameter of about 100 μm. The alloy and flux powders were carefully mixed to provide homogeneous blends filled into cylindrical aluminium cans that were hermetically sealed under vacuum. The hot isostatic pressing was made at a temperature of 500° C. at a pressure of 1000 Bar for 6 hours. After HIPing the cans were removed and the dense material extruded and laboratory cold rolled by the same procedure as the spray formed material in Examples 1 and 2.

A 0.5 mm thick clad sheet consisting of Mg-free AA3003 core material clad with normal AA4045 with 10% clad ratio was tested as a reference material in brazing using the angle on coupon test. In the mini-HEX test (see Brazing tests) a 70 μm unclad corrugated Al alloy fin containing, in wt %, 0.8 Si, 0.23 Fe, 1.62 Mn, 1.5 Zn, and 0.12 Zr.

Clad Package Production

The core materials were laboratory cold rolled to a gauge suitable for pack rolling, i.e. roll application of additional metal alloy layers to provide a metallic laminated sheet. Then, the cores were heat treated at a temperature of 250° C.

Filler alloy layers were made from pieces of AA4343 and AA4045 that were cold rolled down to gauges suitable for clad package rolling and then heat treated at a temperature of 380° C. Material for the flux composite layer was cold rolled to gauges suitable for clad package rolling and then heat treated at a temperature of 380° C. The cladding plates were made by combining the flux composite layer with one or several filler alloy layers using cold clad lab rolling to a thickness suitable for pack rolling and then heat treated at a temperature of 380° C.

The cladding plates and the cores were then attached to each other using cold clad rolling and rolled to the final gauges. Finally, the clad samples were partially annealed at a temperature of 250° C. to H24 temper.

The chemical compositions and thickness of claddings were determined using glow discharge optical emission spectroscopy (GDOES) and light optical microscopy. The amount of flux is expressed as the amount of $AlKF_4$ and based on measurement of the content of K.

Brazing Tests

Depending on the total material thickness two different brazing tests were used based on two different test geometries. Either a miniature heat exchanger model (mini-HEX) was made and braze tested or a so-called angle-on-coupon (AOC) test was used in brazing. No additional flux was applied on any sample.

In the angle on coupon test the clad material according to the invention were used as a flat coupon onto which an unclad 90° bent angle made from Mg-free AA3003 was attached. These tests were made in a glass brazing furnace. The heating rate from room temperature to the brazing temperature 600° C. was a linear 60° C./min followed by 1 min soaking at temperature and finalised by cooling in air. The nitrogen gas flow rate was set to 11 standard litres/min (SLM).

For practical sample handling reasons and to simulate a real situation with better contact between the surfaces than in angle on coupon brazing, brazing sheets from each of the samples 7-12 prepared in Example 1 (i.e. the thinnest samples) were used as tube stock for making a mini-HEX. The mini-HEX was made from two parallel tube stock sheets according to the invention with 16 mm width and 200 mm length and a corrugated fin arranged between the plates. The package was held together using a suitable fixture. The brazing was made in a batch CAB furnace with an atmosphere that had <50 ppm $O_2$ and a dew point of <−40° C. The heating cycle comprised heating from room temperature to 600° C. in 15 min and soaking for 3 min at that temperature before cooling to room temperature again.

Four pieces of all samples were made. All brazed joints were inspected for stitches and other defect types and the brazing results were ranked on a scale 1-5. The best mark is 1 which means immediate wetting upon melting of the filler and excellent defect free joints, 2 means slightly slower wetting and joint formation but still defect free joints, 3 means longer time for wetting but acceptable joints with few defects that are of aesthetic character, 4 means one or more pieces had defect joints and 5 means that joining was absent.

Example 1 (Invention)

Cladding plates with three layers were made using AA4045 filler alloy as a lid layer (filler alloy layer constituting the outermost surface of the final brazing sheet) and a base layer (filler alloy layer facing the core in the brazing sheet) and a flux composite layer with AA4045 as matrix positioned in between the lid and base layers. The resulting three layer cladding plates were attached to cores as indicated above. The sample matrix is seen in Table 1 and varies the product gauge, the cladding gauge, the flux composite layer clad ratio and thereby the flux composite layer gauge, the flux load and the total amount of filler alloy. This creates a variation in available flux amount and flux load as well as diffusion distance to the oxide/metal interface.

The reference sample provided no brazed joints whereas all samples according to the invention, with a flux load as low as 0.05 g/m$^2$ to be compared with 2-5 g/m$^2$ generally recommended in commercial production, provided joints that were at least deemed acceptable and more often deemed to be very good.

TABLE 1

| Sample | Total gauge [mm] | Cladding gauge [μm] | Flux composite layer gauge [μm] | Approximative proportion of lid:flux composite:base | Flux Load [g/m$^2$] | Braze test | Braze result rank |
|---|---|---|---|---|---|---|---|
| 1 | 0.5 | 56 | 6 | 1:1:8 | 0.29 | AOC | 1 |
| 2 | 0.5 | 51 | 12 | 1:2:7 | 0.77 | AOC | 1 |
| 3 | 0.5 | 52 | 14 | 1:3:6 | 1.22 | AOC | 1 |
| 4 | 0.35 | 38 | 4 | 1:1:8 | 0.24 | AOC | 1-2 |
| 5 | 0.35 | 37 | 8 | 1:2:7 | 0.50 | AOC | 1 |
| 6 | 0.35 | 36 | 11 | 1:3:6 | 0.81 | AOC | 1 |
| 7 | 0.2 | 23 | 3 | 1:1:8 | 0.11 | mini-HEX | 2-3 |
| 8 | 0.2 | 23 | 5 | 1:2:7 | 0.31 | mini-HEX | 1 |
| 9 | 0.2 | 21 | 6 | 1:3:6 | 0.56 | mini-HEX | 1 |
| 10 | 0.1 | 11 | 2 | 1:1:8 | 0.05 | mini-HEX | 3 |
| 11 | 0.1 | 10 | 3 | 1:2:7 | 0.14 | mini-HEX | 2-3 |
| 12 | 0.1 | 10 | 3 | 1:3:6 | 0.21 | mini-HEX | 2 |
| Reference | 0.5 | 50 | 0 | 0:0:10 | 0 | AOC | 5 |

Example 2 (Comparative)

Two layered cladding plates were made consisting of a flux composite layer as in Example 1 combined with a filler alloy layer of AA4343 to form a two layered cladding on a core. Brazing sheets were made with different proportions of the braze cladding made up by the flux composite layer. Comparisons were also made between brazing sheets with the flux composite layer of the cladding facing the core surface (denoted as "core") and brazing sheets with the flux composite layer constituting the outermost surface (denoted as "air").

The sample denotation and constitution as well as the braze results are shown in Table 2. Comparing the results of Tables 1 and 2, it appears that for samples with similar flux load the three layer braze claddings in Example 1 gave better braze results than the two layer braze claddings of this Example 2. It also appears that slightly better brazing results were obtained when the flux composite layer did not form the outer surface of the brazing sheet.

TABLE 2

| Sample | Total gauge [mm] | Total clad gauge [μm] | Approximate proportion of flux composite:AA4343 | Flux composite layer gauge [μm] | Flux load [g/m²] | Braze test | Braze result rank |
|---|---|---|---|---|---|---|---|
| 13 | 0.3 | 29 | 1:0 | 29 | 3.35 | AOC | 1 |
| 14 air | 0.3 | 32 | 6:4 | 16 | 1.67 | AOC | 2-3 |
| 15 air | 0.3 | 33 | 4:6 | 12 | 1.54 | AOC | 2-3 |
| 16 air | 0.3 | 29 | 3:7 | 8 | 1.08 | AOC | 3-4 |
| 17 air | 0.3 | 29 | 2:7 | 5 | 0.56 | AOC | 4-5 |
| 18 air | 0.3 | 29 | 1:7 | 3 | 0.19 | AOC | 5 |
| 19 core | 0.3 | 32 | 8:2 | 22 | 1.84 | AOC | 2 |
| 20 core | 0.3 | 28 | 6:4 | 13 | 1.12 | AOC | 2 |
| 21 core | 0.3 | 31 | 4:6 | 11 | 0.89 | AOC | 2 |
| 22 core | 0.3 | 28 | 3:7 | 8 | 0.47 | AOC | 3 |
| 23 core | 0.3 | 29 | 2:7 | 8 | 0.39 | AOC | 3 |
| 24 core | 0.3 | 30 | 1:7 | 8 | 0.23 | AOC | 4 |
| Reference | 0.5 | 50 | 0:1 | 0 | 0 | AOC | 5 |

Example 3 (Invention)

Cladding plates were prepared and attached to AA3003 cores in the same way as in Example 1, with the exception for the materials for the flux composite layer that had been prepared by HIP of various amounts of flux powder and metal powder of various aluminium alloys. Each cladding plate consisted of 10% AA4045 lid layer, 10% flux composite material, and 80% AA4045 base layer. The total gauge of the resulting brazing sheets was 0.3 mm, with a 30 μm braze cladding consisting of about 3 μm of lid filler alloy, 3 μm of flux composite and 24 μm of base filler alloy, on a 270 μm AA3003 core. AOC brazing tests were made as in Example 1. The alloy composition in wt % for the flux composites used and brazing results appear in Table 3 below:

TABLE 3

| No. | Si | Fe | Mn | Cu | Mg | Zn | Zr | Cr | V | Ti | Flux load [g/m²] | Braze result rank |
|---|---|---|---|---|---|---|---|---|---|---|---|---|
| 1 | 8 | 0.20 | | | ≤0.01 | | | | | | 0.41 | 1 |
| 2 | 3.8 | 0.10 | | | ≤0.01 | | | | | | 0.87 | 2 |
| 3 | 8 | 0.20 | | | ≤0.01 | | | | | | 0.19 | 2 |
| 4 | 10 | 0.20 | | | ≤0.01 | | | | | | 1.01 | 1 |
| 5 | 10 | 0.20 | | | ≤0.01 | | | | | | 1.16 | 1 |
| 6 | 12.7 | 0.20 | | | ≤0.01 | | | | | | 1.38 | 1 |
| 7 | 14.6 | 0.20 | | | ≤0.01 | | | | | | 0.33 | 1 |
| 8 | 8.0 | 0.47 | 0.50 | 0.18 | 0.02 | | | | | | 0.37 | 1 |
| 9 | 8.0 | 0.53 | 1.01 | 0.40 | 0.02 | | | | | | 0.40 | 2 |
| 10 | 8.0 | 0.54 | 1.53 | 0.57 | 0.03 | | 0.10 | 0.10 | 0.11 | 0.11 | 0.40 | 4 |
| 11 | 7.9 | 0.96 | 2.31 | | 0.03 | | 0.19 | 0.24 | 0.28 | 0.23 | 0.36 | 5 |
| 12 | 7.9 | 0.18 | | | 0.25 | | | | | | 0.39 | 4-5) |
| 13 | 8 | 0.20 | | | 0.4 | | | | | | 0.32 | 5 |
| 14 | 9.7 | 0.21 | | | ≤0.01 | 0.97 | | | | | 0.36 | 1 |
| 15 | 9.8 | 0.21 | | | ≤0.01 | 4.1 | | | | | 0.45 | 1 |
| 16 | 10.1 | 0.20 | | | ≤0.01 | 8.0 | | | | | 0.42 | 1 |

In addition to the elements indicated in the Table, the balance was aluminium and ≤0.05 each and ≤0.15% in total of inevitable impurities.

Example 4 (Invention)

A cladding plate was prepared and attached to AA3003 cores in the same way as in Example 3, with the exception for the lid alloy that was AA1050 (0.19 wt % Si, 0.22 wt % Fe, balance Al and inevitable impurities). The base layer was AA4045 as in Example 1 and the material for the flux composite was the same as in No. 1 in Table 3. The flux load was 0.4 g/m2 and the result of the same brazing test as in Example 3 was ranked as 2.

The invention claimed is:

1. Brazing sheet comprising a core layer and a braze cladding, said core layer being aluminium or an aluminium alloy, said braze cladding comprising
   (a) a flux composite layer, which flux composite layer comprises a matrix of aluminium or an aluminium alloy, said matrix containing flux particles;
   (b) a filler alloy layer not containing flux particles; and
   (c) an aluminium or aluminium alloy layer not containing flux particles, said layer forming the outermost surface of at least one side of the brazing sheet,
   wherein the flux composite layer (a) is positioned between said filler alloy layer (b) and said aluminium or aluminium alloy layer (c), and
   wherein a liquidus temperature of the filler alloy layer is lower than a solidus temperature of the aluminium or aluminium alloy of the core layer.

2. Brazing sheet as claimed in claim 1, wherein the aluminium or aluminium alloy layer (c) forming the outermost surface of at least one side of the brazing sheet is a filler alloy layer.

3. Brazing sheet as claimed in claim 1, wherein the aluminium or aluminium alloy layer (c) forming the outermost surface of at least one side of the brazing sheet is a non-filler aluminium or aluminium alloy layer.

4. Brazing sheet as claimed in claim 1, wherein the at least one filler alloy layer is an aluminium alloy comprising from 2 to 15 wt % of Si.

5. Brazing sheet as claimed in claim 1, wherein the matrix in the flux composite layer is aluminium or an AA1XXX, AA2XXX, AA3XXX, AA4XXXX, AA7XXXX, or AA8XXX aluminium.

6. Brazing sheet as claimed in claim 5, wherein the matrix in the flux composite layer is a filler alloy.

7. Brazing sheet as claimed in claim 5, wherein the matrix in the flux composite layer is aluminium or a non-filler aluminium alloy.

8. Brazing sheet as claimed in claim 1, wherein the amount of Mg in the matrix of the flux composite layer is wt %.

9. Brazing sheet as claimed in claim 1, wherein the flux is at least one inorganic salt comprising F and at least one of Li, Na, K, Rb, Cs, Fr, Al, Zn or Sn.

10. Brazing sheet as claimed in claim 1, wherein content of flux in the flux composite layer is from 1 to 20 wt %.

11. A method for the manufacturing of a brazing sheet according to claim 1, the method comprising the steps of joining a core layer of an aluminium alloy, a filler alloy layer not containing flux particles, a flux composite layer of a matrix of aluminium or an aluminium alloy, said matrix containing flux particles, and an aluminium or aluminium alloy layer not containing flux particles forming the outermost surface of at least one side of the brazing sheet and the flux composite layer being positioned between said filler alloy layer and said aluminium or aluminium alloy layer, followed by rolling to obtain a brazing sheet of the desired gauge.

12. Brazing sheet as claimed in claim 1, wherein the filler alloy layer is an AA4XXX alloy.

13. Brazing sheet as claimed in claim 1, wherein the core layer is an AA2XXX, AA3XXX, AA6XXX, AA7XXX, or AA8XXX alloy.

14. Brazing sheet comprising a core layer and a braze cladding, said core layer being aluminium or an aluminium alloy, said braze cladding comprising
    (a) a flux composite layer, which flux composite layer comprises a matrix of aluminium or an aluminium alloy, said matrix containing flux particles;
    (b) a filler alloy layer not containing flux particles; and
    (c) an aluminium or aluminium alloy layer not containing flux particles, said layer forming the outermost surface of at least one side of the brazing sheet,
    wherein the flux composite layer (a) is positioned between said filler alloy layer (b) and said aluminium or aluminium alloy layer (c),
    wherein the aluminium or aluminium alloy of the core layer has a composition including less than or equal to 2 wt % Si, and
    wherein the filler alloy layer is an aluminium alloy including from 4 to 15 wt % of Si.

15. Brazing sheet as claimed in claim 14, wherein the aluminium or aluminium alloy layer (c) forming the outermost surface of at least one side of the brazing sheet is a filler alloy layer.

16. Brazing sheet as claimed in claim 14, wherein the aluminium or aluminium alloy layer (c) forming the outermost surface of at least one side of the brazing sheet is a non-filler aluminium or aluminium alloy layer.

17. Brazing sheet as claimed in claim 14, wherein the at least one filler alloy layer is an aluminium alloy comprising from 6 to 13 wt % of Si.

18. Brazing sheet as claimed in claim 14, wherein the matrix in the flux composite layer is aluminium or an AA1XXX, AA2XXX, AA3XXX, AA4XXXX, AA7XXXX, or AA8XXX aluminium.

19. Brazing sheet as claimed in claim 18, wherein the matrix in the flux composite layer is a filler alloy.

20. Brazing sheet as claimed in claim 18, wherein the matrix in the flux composite layer is aluminium or a non-filler aluminium alloy.

21. Brazing sheet as claimed in claim 14, wherein the amount of Mg in the matrix of the flux composite layer is wt %.

22. Brazing sheet as claimed in claim 14, wherein the flux is at least one inorganic salt comprising F and at least one of Li, Na, K, Rb, Cs, Fr, Al, Zn or Sn.

23. Brazing sheet as claimed in claim 14, wherein content of flux in the flux composite layer is from 1 to 20 wt %.

24. Brazing sheet as claimed in claim 14, wherein the filler alloy layer is an AA4XXX alloy.

25. Brazing sheet as claimed in claim 14, wherein the core layer is an AA2XXX, AA3XXX, AA6XXX, AA7XXX, or AA8XXX alloy.

* * * * *